US005784702A

United States Patent [19]
Greenstein et al.

[11] Patent Number: 5,784,702
[45] Date of Patent: Jul. 21, 1998

[54] SYSTEM AND METHOD FOR DYNAMICALLY PERFORMING RESOURCE RECONFIGURATION IN A LOGICALLY PARTITIONED DATA PROCESSING SYSTEM

[75] Inventors: Paul Gregory Greenstein, Cronton-On-Hudson; Richard Roland Guyette, LaGrangeville; John Ted Rodell, Wappingers Falls, all of N.Y.

[73] Assignee: Internatinal Business Machines Corporation, Armonk, N.Y.

[21] Appl. No.: 807,733

[22] Filed: Feb. 27, 1997

Related U.S. Application Data

[63] Continuation of Ser. No. 387,360, Feb. 13, 1995, Pat. No. 5,659,786, which is a continuation of Ser. No. 963,498, Oct. 19, 1992, abandoned.

[51] Int. Cl.$^6$ ............................................. G06F 13/00
[52] U.S. Cl. ................. 711/173; 711/170; 395/182.01; 395/182.03; 395/183.18; 395/200.51; 395/200.52; 395/653; 395/674; 395/800.13; 395/800.15; 395/828
[58] Field of Search ........................ 395/480, 497.04, 395/182.01, 182.03, 183.18, 200.51, 200.52, 653, 674, 800.13, 800.15, 828; 711/170, 173

[56] References Cited

U.S. PATENT DOCUMENTS

| | | | |
|---|---|---|---|
| 4,511,964 | 4/1985 | Georg et al. | 395/412 |
| 4,980,857 | 12/1990 | Walter et al. | 395/183.21 |
| 5,253,344 | 10/1993 | Bostick et al. | 395/828 |
| 5,257,379 | 10/1993 | Cwiakala et al. | 395/651 |
| 5,345,590 | 9/1994 | Ault et al. | 395/406 R |
| 5,371,867 | 12/1994 | George et al. | 395/406 R |
| 5,452,455 | 9/1995 | Brown et al. | 395/653 |

*Primary Examiner*—Tod R. Swann
*Assistant Examiner*—Denise Tran
*Attorney, Agent, or Firm*—Lawrence D. Cutter; Heslin & Rothenberg, PC

[57] ABSTRACT

A dynamic reconfiguration request for a change in a system's physical configuration is transmitted from a configuration controller to a hypervisor controlling operating systems executing in one or more partitions of the system. The hypervisor translates the physical reconfiguration request into a request for reconfiguration of logical resources known to the operating systems, first verifying it against an installation policy, and passes the requests to the operating systems in the partitions. The operating systems perform logical reconfiguration, then request physical reconfiguration of the hypervisor. The hypervisor initiates the physical reconfiguration through the configuration controller.

17 Claims, 17 Drawing Sheets

| RESOURCE TYPES | PHYSICAL RESOURCES 1128 | LOGICAL RESOURCES 1129 | | | |
|---|---|---|---|---|---|
| | | 1124 LP A | 1125 LP B | 1126 LP C | 1127 LP D |
| CPUs | 4  1101 | 1  1107 | 2  1110 | 2  1116 | 1  1121 |
| CHPs | 256  1102 | 64  1108 | 64  1111 | 64  1117 | 64  1122 |
| STORAGE ELEMENTS | SE0—256MBYTES SIDE 0  1103 | SE0—128MBYTES 1109 | SE0—128MBYTES 1112 | SE0—128MBYTES 1118 | SE0—128MBYTES |
| | SE1—256MBYTES SIDE 0  1104 | | SE2—64MBYTES 1114 | SE1—64MBYTES 1119 | |
| | SE2—256MBYTES SIDE 1  1105 | | SE1—128MBYTES 1113 | | |
| | SE3—256MBYTES SIDE 1  1106 | | SE3—64MBYTES 1115 | SE2—64MBYTES 1120 | —128MBYTES 1123 |

FIG.11

| POLICY FOR SI→PP 1301 | KEEP LP A INTACT | 1302 |
| | DEACTIVATE LP D | 1303 |
| | SPLIT LP B | 1304 |
| | SPLIT LP C | 1305 |

| OPERATOR REQUEST 1306 | SI→PP | 1307 |

| PHYSICAL REQUIREMENTS 1308 | CONFIGURE SE0 OFFLINE | 1309 |
| | CONFIGURE SE1 OFFLINE | 1310 |

CONFIGURE SE0 IN LP C OFFLINE

| INITIAL ACTIONS AFTER MAPPING PHYSICAL TO LOGICAL STORAGE ELEMENTS 1311 | DEACTIVATE LP A | 1312 |
| | CONFIGURE SE0 IN LP B OFFLINE | 1313 |
| | CONFIGURE SE2 IN LP B OFFLINE | 1314 |
| | CONFIGURE SE0 IN LP C OFFLINE | 1315 |
| | CONFIGURE SE1 IN LP C OFFLINE | 1316 |
| | CONFIGURE PHYSICAL SE0 OFFLINE | 1325 |
| | CONFIGURE PHYSICAL SE1 OFFLINE | 1326 |

| ACTIONS TAKEN AFTER APPLYING CONFIGURATION POLICY 1318 | DEACTIVATE LP D | 1319 |
| | MOVE LP A TO STORAGE PREVIOUSLY OCCUPIED BY LP D (PHYSICAL STORAGE ELEMENT 2) | 1320 |
| | CONFIGURE SE0 IN LP B OFFLINE | 1321 |
| | CONFIGURE SE2 IN LP B OFFLINE | 1322 |
| | CONFIGURE SE1 IN LP C OFFLINE | 1323 |
| | CONFIGURE SE0 IN LP C OFFLINE | 1324 |
| | CONFIGURE PHYSICAL SE0 OFFLINE | 1327 |
| | CONFIGURE PHYSICAL SE1 OFFLINE | 1328 |

FIG.13

SYSTEM AND METHOD FOR DYNAMICALLY PERFORMING RESOURCE RECONFIGURATION IN A LOGICALLY PARTITIONED DATA PROCESSING SYSTEM

This is a Continuation of application Ser. No. 08/387,360, filed Feb. 13, 1995, U.S. Pat. No. 5,659,786, which is a File Wrapper Continuation of application Ser. No. 07/963,498, filed Oct. 19, 1992, now abandoned.

BACKGROUND OF THE INVENTION

This invention relates to performing and managing hardware resource reconfiguration in a data processing system consisting of a machine and one or more operating systems (a.k.a. control programs (CP)) running on that machine.

BACKGROUND ART

In the prior art, dynamic reconfiguration has been a process performed by software and hardware, but controlled by software. To deconfigure a resource (take it off-line), the CP first deconfigures a resource logically, and then requests (e.g., via an SCLP (Service-Call-Logical-Processor) command in an IBM ES/9000 system) that hardware deconfigure the resource physically. To configure a resource (bring it on-line), the CP first requests (e.g., via an SCLP command) that hardware configure a resource physically, and then performs the necessary logical processing.

For example, to take a processor (CPU) off-line, IBM's MVS/ESA operating system first makes it unavailable for job scheduling, suspends any jobs with CPU affinity, and marks the CPU logically off-line in the mask of CPUs. At completion of logical processing, MVS issues an SCLP command to have the service processor take the CPU physically off-line.

A processor such as one of IBM's ES/9000 processors may operate in one of two modes—basic or LPAR. In LPAR mode, a hypervisor is present that supports all the control programs in all logical partitions. In basic mode, the hypervisor is not present, and each control program executes directly on the machine.

A partition is an independent collection of hardware resources capable of supporting a CP. In basic mode, processors may contain one or two partitions (a.k.a. physical partitions or "sides"). In LPAR mode, each physical partition may contain many logical partitions (LPs).

In basic mode, it is possible to perform dynamic transitions between single-image (SI) mode where both physical partitions are combined under a single CP, and physically-partitioned (PP) mode where each physical partition is running under a different CP. For example, the MVS/ESA CP (MVS) can run on the whole machine, then give up half of its resources and continue running in one physical partition, then reacquire the resources in the other physical partition and run on the whole machine again. The process of splitting or merging a machine while keeping the CP running is called dynamic partitioning or dynamic merging. To perform dynamic partitioning or dynamic merging in the prior art, a set of resources in a physical partition must be taken off-line or brought on-line by an MVS operator.

In the prior art, an LPAR mode processor has not had the capability to perform dynamic partitioning or merging. In order to physically partition the machine, it has been necessary to deactivate all logical partitions (thus terminating the CP in each partition), perform re-initialization in PP mode, and then reactivate LPAR on one or both sides. To merge the physical partitions back, it has been necessary to reverse the procedure, requiring the logical partitions to again be deactivated.

Even if LPAR mode had supported dynamic partitioning by having the logical partitions free up the right resources, the prior art methods of dynamic partitioning would prove undesirable. Complexity of dynamic partitioning in LPAR mode would make it very troublesome to undergo an SI to PP transition. The operator would have to go to each logical partition's console, and make each logical partition free up the right set of resources. Considering that resources presented to logical partitions in LPAR mode are logical resources, and therefore each logical partition's software is not cognizant of its real resources, it would be tedious and prone to significant errors for the operator to determine the right set of resources to take off-line for each logical partition.

The difficulties with reconfiguration are aggravated by the absence of a central point of control. Some actions are performed from the MVS console. This is especially cumbersome in the remote environment where these consoles may be far away from each other.

It is therefore an object of the present invention to provide dynamic partitioning/merging support for an LPAR-mode processor.

It is a further object of the present invention to provide a hardware-initiated dynamic reconfiguration process using heuristic physical-to-logical mapping of resources.

It is a further object of the present invention to provide for establishment of a centralized reconfiguration policy for multiple partitions/systems, and heuristic determination of reconfiguration steps based on that policy.

SUMMARY OF THE INVENTION

According to the present invention dynamic reconfiguration of system resources is provided in a logically partitioned system (IBM's PR/SM-LPAR in a preferred embodiment) without the need for operator involvement to free up resources. In operation, when started by an external stimulus, such as an operator command or a time-driven event, a hardware policy or PR/SM operator requests a physical configuration change. The PCE (Processor Controller Element) passes the request to LPAR, which translates the request into a request (or requests) to a logical partition (or partitions) to free up logical resources (assuming the reconfiguration request is a "deconfigure" type request). LPAR sends the translated requests to operating systems in the logical partition(s), which respond as they would to an operator request by performing logical deconfiguration (possibly checked against a policy), and then physical deconfiguration (via a signal to LPAR). LPAR (which may initiate deconfiguration requests to different partitions in parallel) evaluates the actions by each partition and, if necessary, consults a policy to make needed adjustments to insure that all needed resources are obtained. Finally, LPAR sends the appropriate physical reconfiguration request(s) to the PCE (Processor Controller Element) for execution.

Similarly, the present invention supports the process of dynamic merging, which includes adding resources to logical partitions, and activating additional logical partitions based on the policy. The process for adding resources to logical partitions using this invention is identical to the process for removing resources, except for the reversal of physical and logical resource reconfiguration steps performed by logical partitions.

BRIEF DESCRIPTION OF THE DRAWINGS

FIG. 11 illustrates the physical/logical resource mapping in LPAR mode.

FIG. 13 illustrates an SI→PP transition using the physical/logical mapping of storage and applying the configuration policy in LPAR mode.

DESCRIPTION OF THE PREFERRED EMBODIMENT

Figure 6:
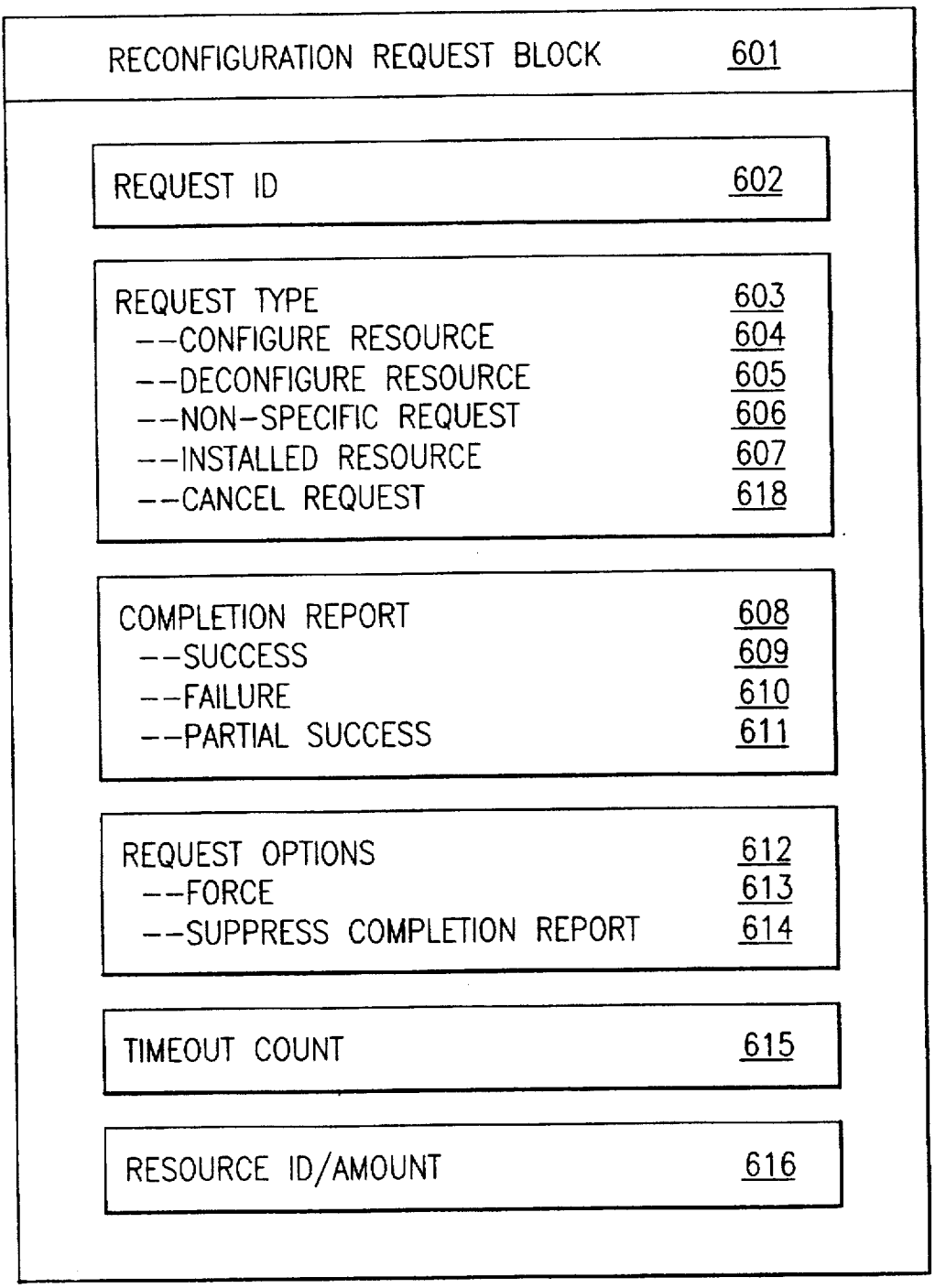
FIG. 6 illustrates the reconfiguration request block.

The following steps are performed in the environment of the Preferred Embodiment (an IBM ES/9000 LPAR-mode processor) to perform hardware-initiated dynamic reconfiguration:

1. Upon detecting a stimulus for reconfiguration (external request, e.g., from the operator, timing-based policy, etc.), the SCLP and LPAR microcode forms a list of reconfiguration requests, each presented as a reconfiguration request block (FIG. 6 at 601), in the form of SCLP events. Each request is identified by an ID field 602 for future reference. Each request contains a resource ID/amount field 616 specifying the type of the resource and the ID or amount of resource to process. If any resource of a given type would satisfy the SCLP request, a nonspecific request indicator 606 is set in the request block, meaning that resource selection is to be performed by the CP.

The request type field 603 indicates what action is requested:

configure resource on-line 604, deconfigure resource off-line 605.

2. The LPAR then uses the SCLP event mechanism to convey the list of reconfiguration requests to the CP.

Figure 9:
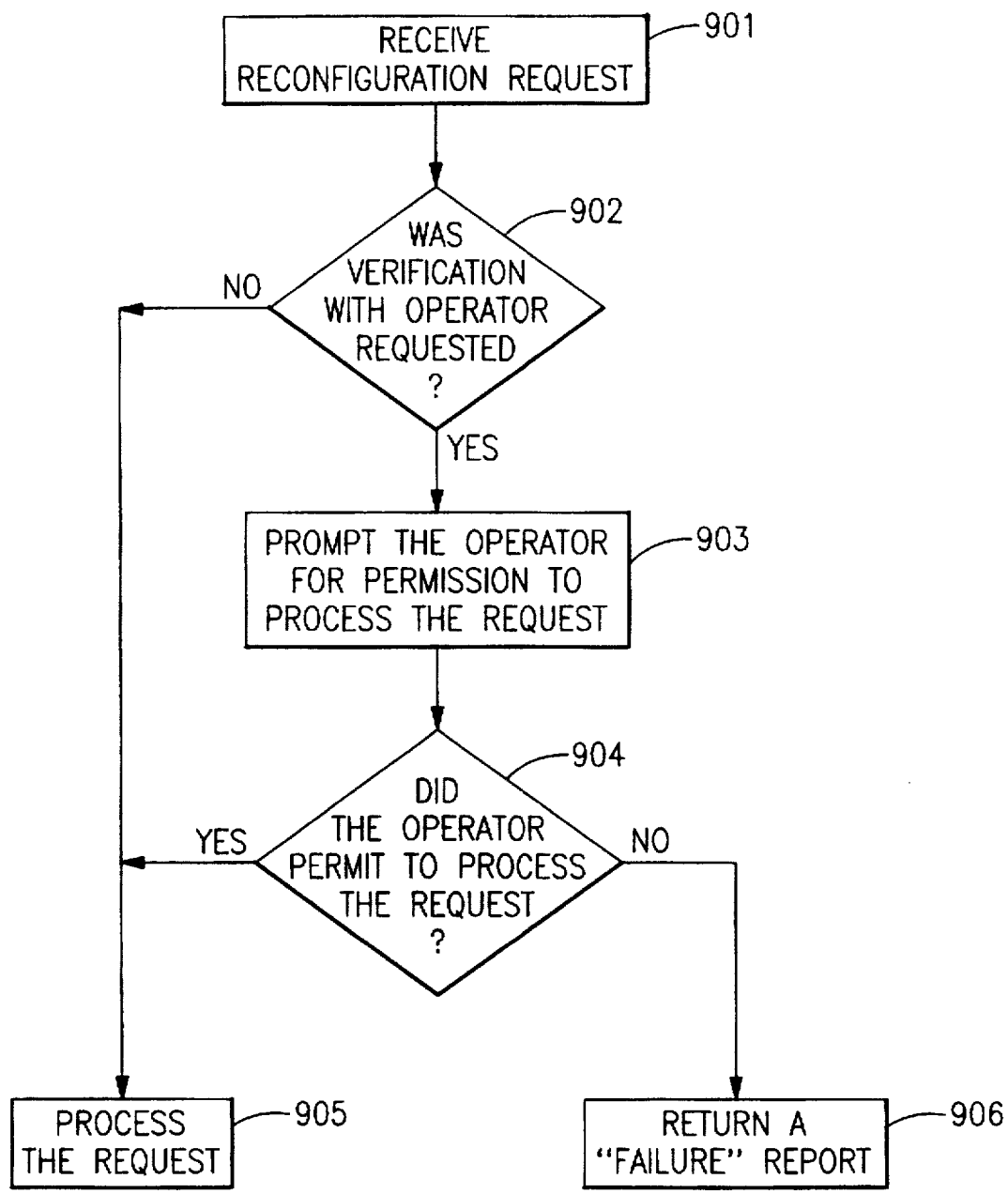
FIG. 9 illustrates the reconfiguration request verification process.

3. The CP examines the list of requests and treats each request as an operator command would be treated (i.e., an appropriate reconfiguration service is invoked with the appropriate input to perform the requested functions). Each request may be optionally verified with the CP operator or CP operations policy. The case of operator verification is illustrated in FIG. 9. (Identical logic would provide an automated policy verification, with a "check policy" instead of "consult operator" for step 903, the check being made against a "yes/no" indicator within the policy definition 101.) When a reconfiguration request is received 901 and operator verification was requested by the installation 902, the operator is prompted for permission to process the request 903. If the operator permits request processing 904, or if no verification was requested, the request is processed 905, otherwise, the request is not processed and a "failure" report is returned to the requester 906.

Figure 10:
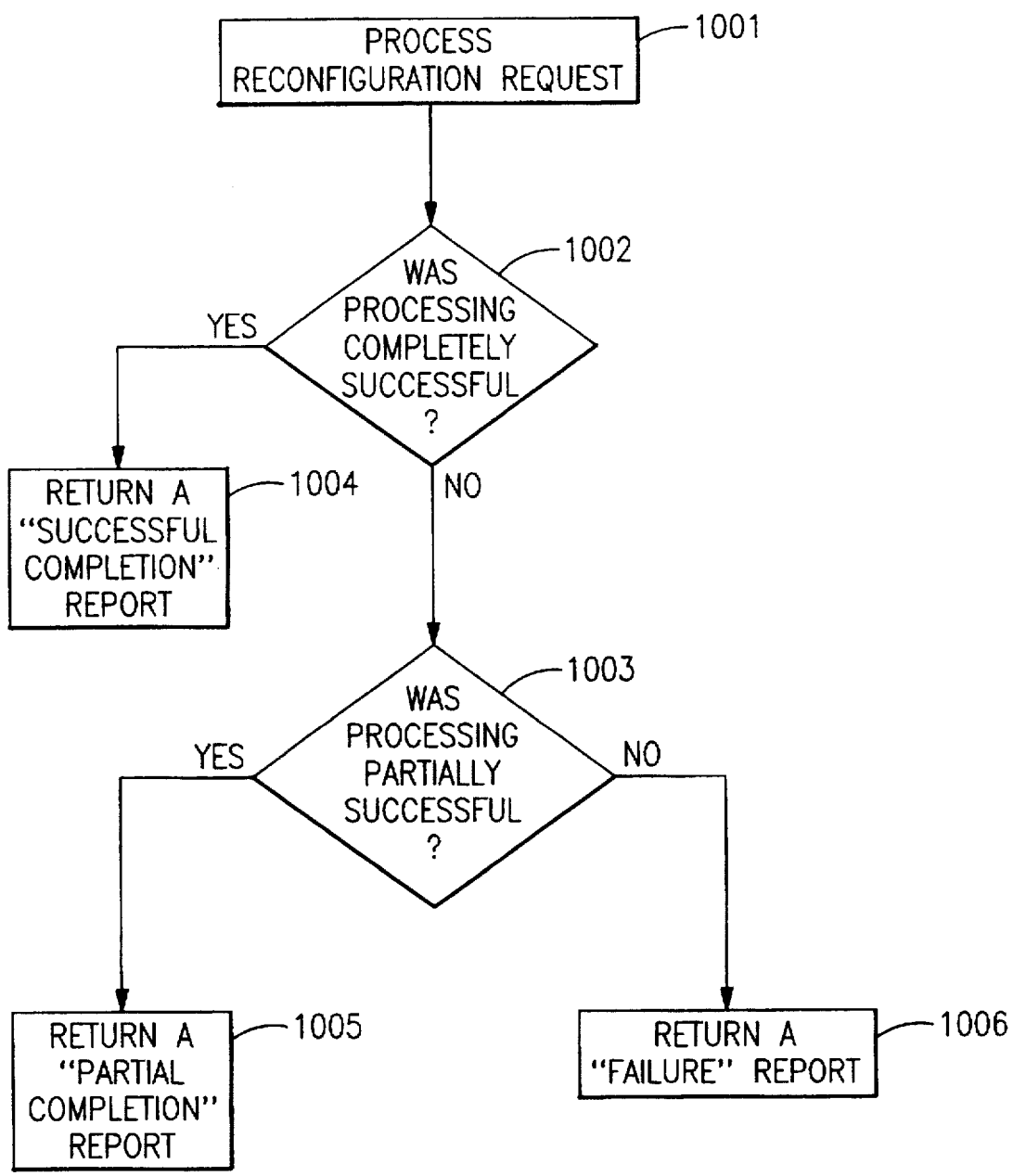
FIG. 10 illustrates the reconfiguration request processing results evaluation.

4. Upon completion of each of the requests in the list received from the SCLP, the CP sends back a report event indicating completion (with the ID of the corresponding reconfiguration request). This process is illustrated in FIG. 10. After a reconfiguration request is processed 1001, the results are evaluated by the CP. If processing was completely successful 1002, the "successful completion" is indicated 1004; if processing was partially successful 1003, the "partial completion" is indicated 1005; otherwise, a failure is indicated 1006. Within the request block, there is a completion report field 608, indicating what the outcome of the reconfiguration request is:

successful completion 609, partially successful completion 611 (with a specification of the completed amount of resource in the resource amount field 616, e.g., the request was to deconfigure 10 Mbytes of real storage, but only 4 Mbytes could be freed up by the CP), failure 610.

The CP suppresses the completion report if report suppression is requested by the SCLP (via a special request option 614 in the request options fields 612).

The CP may optionally report the performed configuration changes to the CP operator.

5. Each reconfiguration request contains a timeout field 615, specifying the desired request execution completion time. If the request is not executed by the CP within the specified time, the microcode assumes that the request execution has failed.

Figure 1:
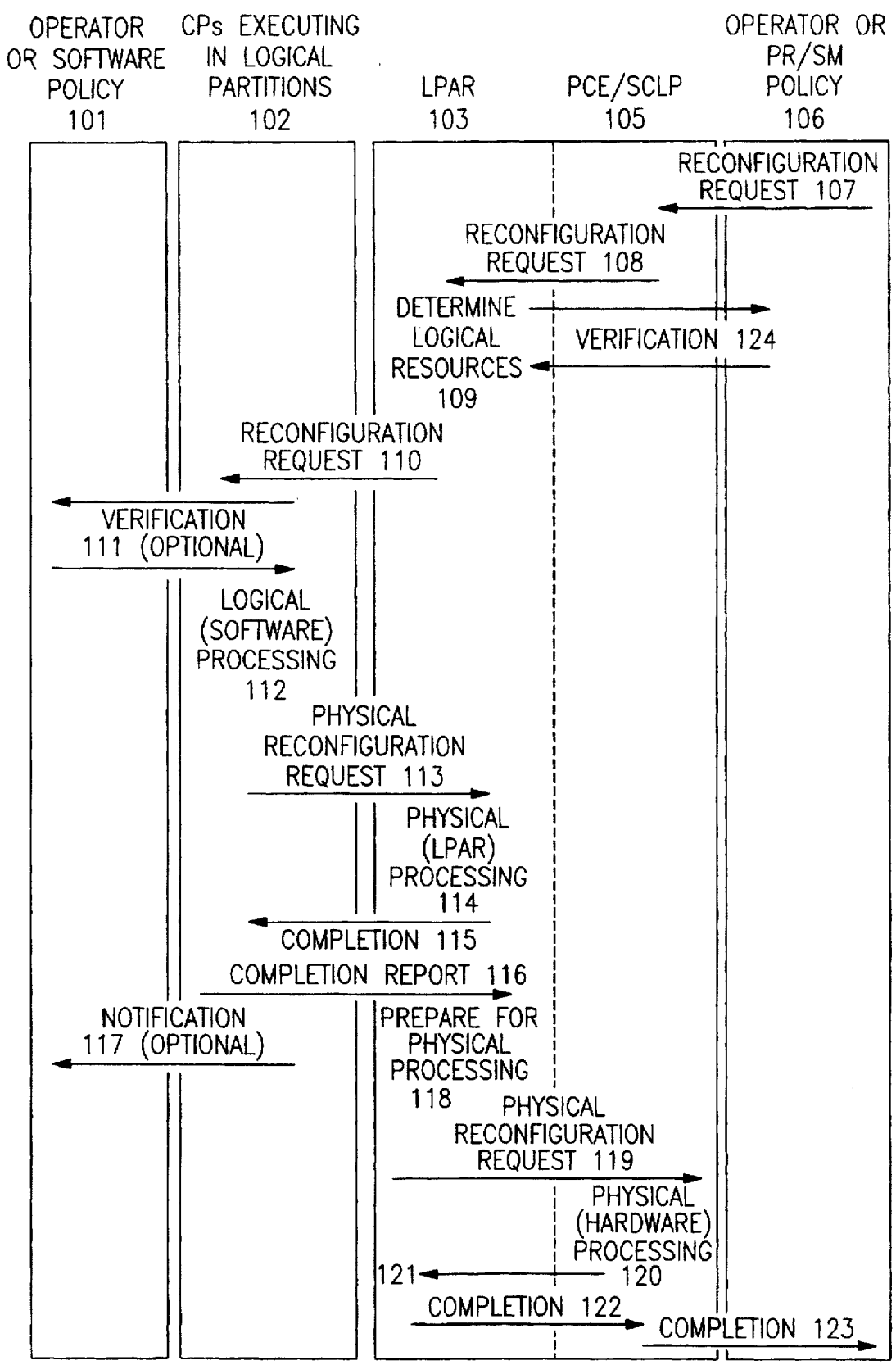
FIG. 1 illustrates hardware-initiated dynamic reconfiguration in LPAR mode for the off-line case.

FIG. 1 illustrates the hardware-initiated dynamic reconfiguration process in LPAR mode for the case of taking a single resource off-line. PR/SM LPAR operator or policy 106 determines that a configuration change is necessary. It generates a reconfiguration request 107 (in a form of an operator command on the system (hardware) console or via an internal trigger to microcode) and directs it to the SCLP 105. Upon receipt of this request, the SCLP forwards the request 108 to LPAR microcode 103. LPAR translates the request 109 into the appropriate set of logical resources as perceived by a logical partition (note that more than one logical partition may be affected by a single physical hardware resource), using the mapping between logical and physical resources described below in the "Mapping" section and produces a proposed set of reconfiguration actions. Then the proposed set of reconfiguration actions is verified 124 against the policy (see "Policy" description below) to produce a set of Actual Actions. The actual reconfiguration request 110 (containing logical resource ID(s) as recognized by the affected logical partition(s)) is sent to the CPs that execute in logical partitions 102. When presented with a reconfiguration request, each CP may optionally verify it 111 with its operator or policy 101. Once permission is granted, the CP performs the required processing using the conventional reconfiguration process (logical processing 112 (termination of resource usage) and physical reconfiguration via SCLP 113 114 ). Note that in the LPAR environment "physical processing" may mean taking a resource away from a logical partition and not necessarily actual physical resource state change. This process includes logical processing 112 (conventional except for its manner of initiation—by LPAR), physical reconfiguration via an SCLP command 113 (conventional), processing of that SCLP command by the LPAR microcode 114 (conventional—an analog of software processing 112, by which LPAR tables are updated to reflect new status of about-to-be-reconfigured resources), and indication of completion of the physical processing 115. Once the conventional logical and physical reconfiguration processing is complete, each CP evaluates the results (see FIG. 10) and sends to the LPAR a completion report SCLP event 116. The CPs may also optionally notify their operators of the outcome 117. The LPAR microcode completes its analogue of logical processing 118, (i.e., terminate usage of a resource to be physically removed) and then internally issues an SCLP command 119 (for the same physical resource that was specified on the original reconfiguration request 108) to perform physical reconfiguration of the target resource. The SCLP performs physical processing 120 and indicates completion to the LPAR 121. Then, LPAR produces and sends a completion report 122 to the SCLP, which in turn passes it on 123 to the originator of the reconfiguration request.

The case of bringing a resource on-line is identical to the off-line case illustrated in FIG. 1, except for the fact that step 112 is executed after step 115.

In LPAR mode, dynamic partitioning/merging in the hardware-initiated reconfiguration environment is complicated by the fact that the configuration reported to the CP by LPAR is a logically represented subset of the actual physical configuration.

In a SI→PP transition in LPAR mode, the resources owned by the logical partitions are logical resources. The reconfiguration process used by the machine to satisfy the physical resource requirements is similar to that done by MVS in going from SI to PP. Specifically, it is necessary to map (collect) the resources that have not been freed up by logical partitions during the preceding partition reconfiguration steps into the set of physical resources that will survive the partitioning. To do this, LPAR may need to move a logical partition's main (central) and expanded storage (not directly addressable) around such that it is all concentrated in the central and expanded storage elements that are staying on-line on the surviving side. If the amount of logical resources remaining exceeds the amount of corresponding surviving physical resources, a policy is consulted to determine which logical partitions will be forced to release additional resources. Removal of additional resources may involve sending a new set of reconfiguration requests, possibly with the FORCE option 613 or deactivation of one or more logical partitions.

Policy

To accomplish dynamic partitioning and merging in LPAR mode, a centralized policy will be established and maintained by the SCLP (e.g., by means of the "PR/SM system console"). The policy will include the logical partition layouts for all valid configurations (e.g., in SI mode, on side 0 in PP mode, and on side 1 in PP mode). A policy, as specified by an installation, may define:

1) Intended distribution of resources (E.g., LP A should be twice the size of LP B; LP C should be half again the size of LP A.)

2) Rules which must not be violated (E.g., LP B must never have less than 16 Meg of storage (or a network with 20,000 terminals will crash); LP C does not support hardware-initiated-reconfiguration).

3) Rules for resolving conflicts between (1) and (2).

4) Rules for resolving conflicts between (2) and system operator requests.

5) Rules for dealing with failures of control programs to meet the requested objectives for resources to be returned.

Based on these descriptions, LPAR microcode will derive the reconfiguration actions necessary to accomplish the dynamic SI/PP transitions. Actions may include:

addition of logical resources to a partition, removal of logical resources from a partition, activation of a logical partition, deactivation of a logical partition, moving/remapping physical resources transparently to logical resources owned by logical partitions.

Using the mechanism described above (see FIG. 2), SCLP or LPAR will build the reconfiguration request lists for each logical partition capable of accepting the reconfiguration requests from the SCLP, send the requests to each such logical partition, and monitor the completion reports arriving from the logical partitions.

The request lists for different partitions may be sent concurrently and executed by partitions in parallel. Parallel execution is also possible within a partition while processing reconfiguration requests.

Not all logical partitions may be capable of accepting the reconfiguration requests from LPAR. Based on the policy, LPAR may compensate for the inability of some logical partitions to perform dynamic reconfiguration by requesting additional actions to be performed by logical partitions capable of accepting reconfiguration requests. As a result, CPs incapable of accepting reconfiguration requests will not present an obstacle for SI/PP transitions and can take advantage of dynamic partitioning/merging.

A "Heuristic method" is "Any exploratory method of solving problems in which an evaluation is made of the progress toward an acceptable final result using a series of approximate results; for example, by a process of guided trial and error." The heuristic nature of the dynamic partitioning in the environment of the present invention is based on policy revisions if the desired results were not achieved on a given iteration (by a given HIR request series).

As a result of collecting feedback from partitions, LPAR and/or the operator may dynamically modify the configuration policy, and, in a case of a failure, retry with a modified set of requests.

Figure 2:
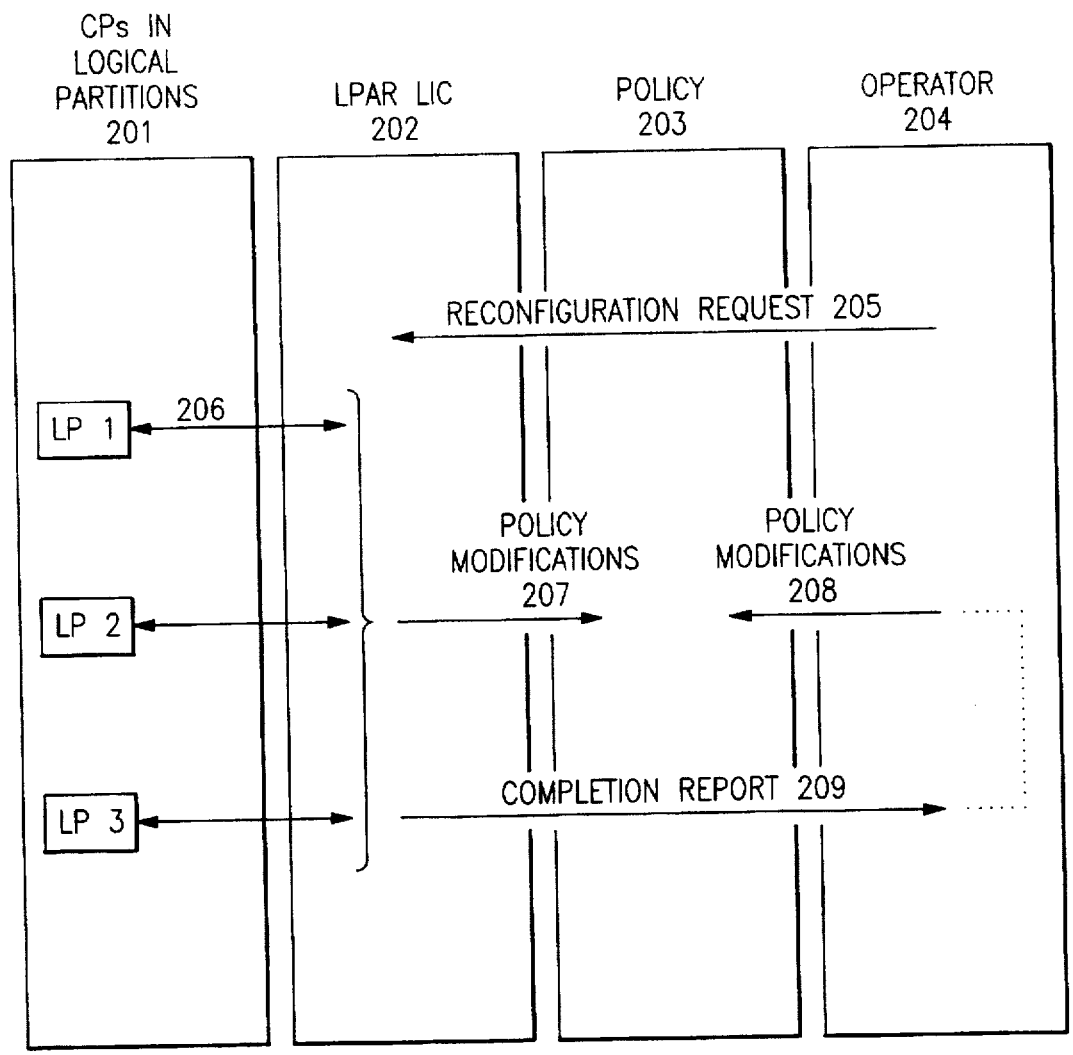
FIG. 2 illustrates hardware-initiated dynamic reconfiguration policy handling in LPAR mode.

FIG. 2 illustrates the above process. When the hardware operator 204 sends a reconfiguration request 205 to LPAR microcode 202 via a policy 203 activation. LPAR LIC interfaces with CPs in a logical partitions 201 to perform the specified request. Should it be necessary based on feedback 206 from the CPs in the logical partitions, LPAR microcode may determine required policy modification 207 and suggest them to the operator. When the completion reports 209 are presented to the controlling hardware operator, the operator may also enact policy modifications 208.

Figure 7:
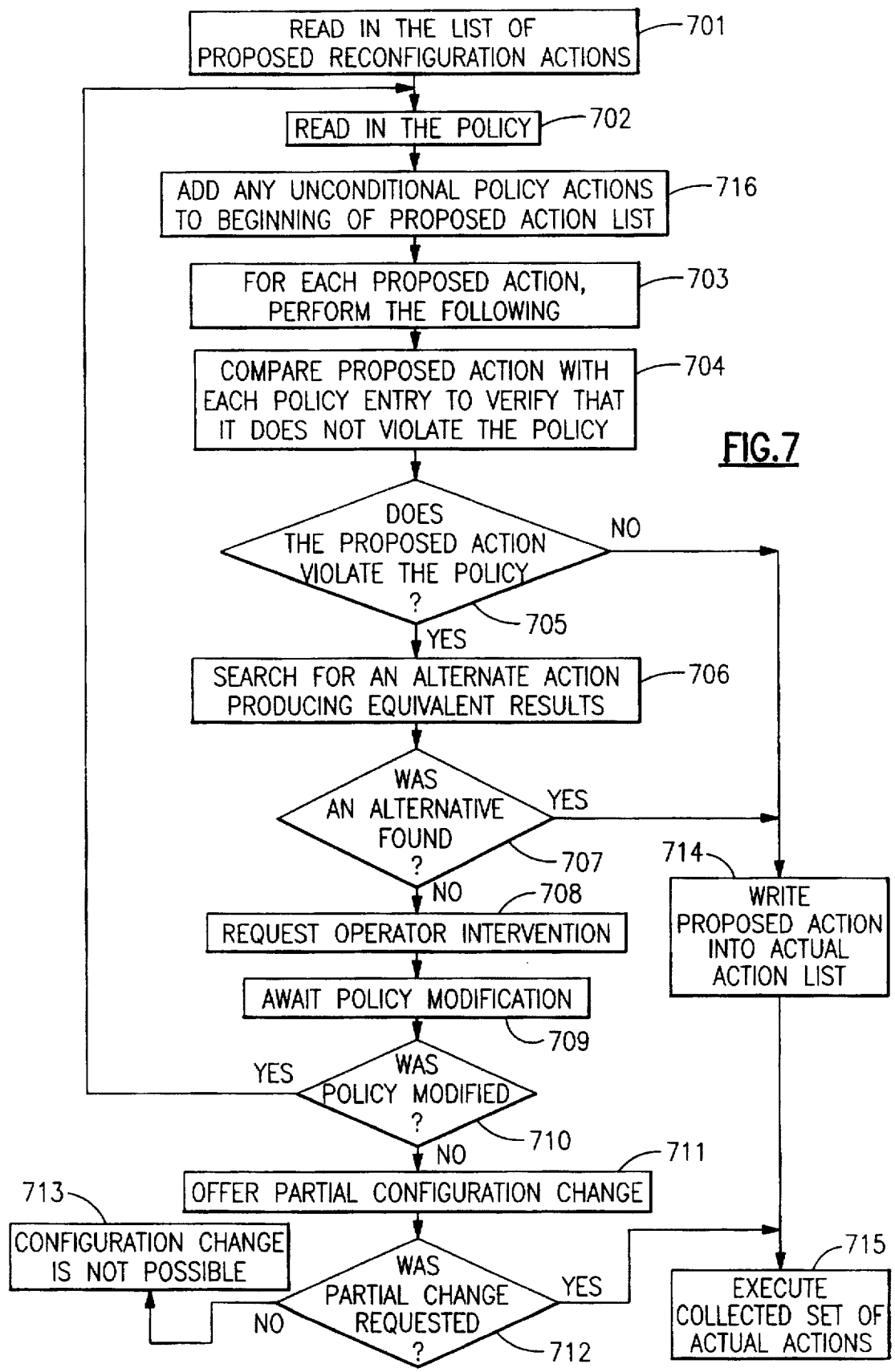
FIG. 7 illustrates the process of deriving the set of actual reconfiguration actions to be taken from the policy and the set of proposed reconfiguration actions.

FIG. 7 illustrates the logic for executing the policy, determining and enacting the policy modifications. When a list of proposed reconfiguration actions is read in 701, the policy directives are also read in 702. Next, 716, any of these policy directives dictating unconditional actions corresponding to the proposed reconfiguration action result in the unconditional actions being added to the beginning of the proposed action list (eliminating any duplicative actions). For each proposed action, the following process is performed 703:

Each proposed action is compared with each policy entry 704 to verify that it does not violate any of the policy directives.

If the proposed action does not violate the policy 705, it is recorded in the actual action list 714. When all actions are processed, the full set of actual configuration changes is executed 715.

If the proposed action violates the policy 705, an attempt is made to determine a set of preliminary steps that would allow the action to be taken without violating the policy 706.

Figure 16:
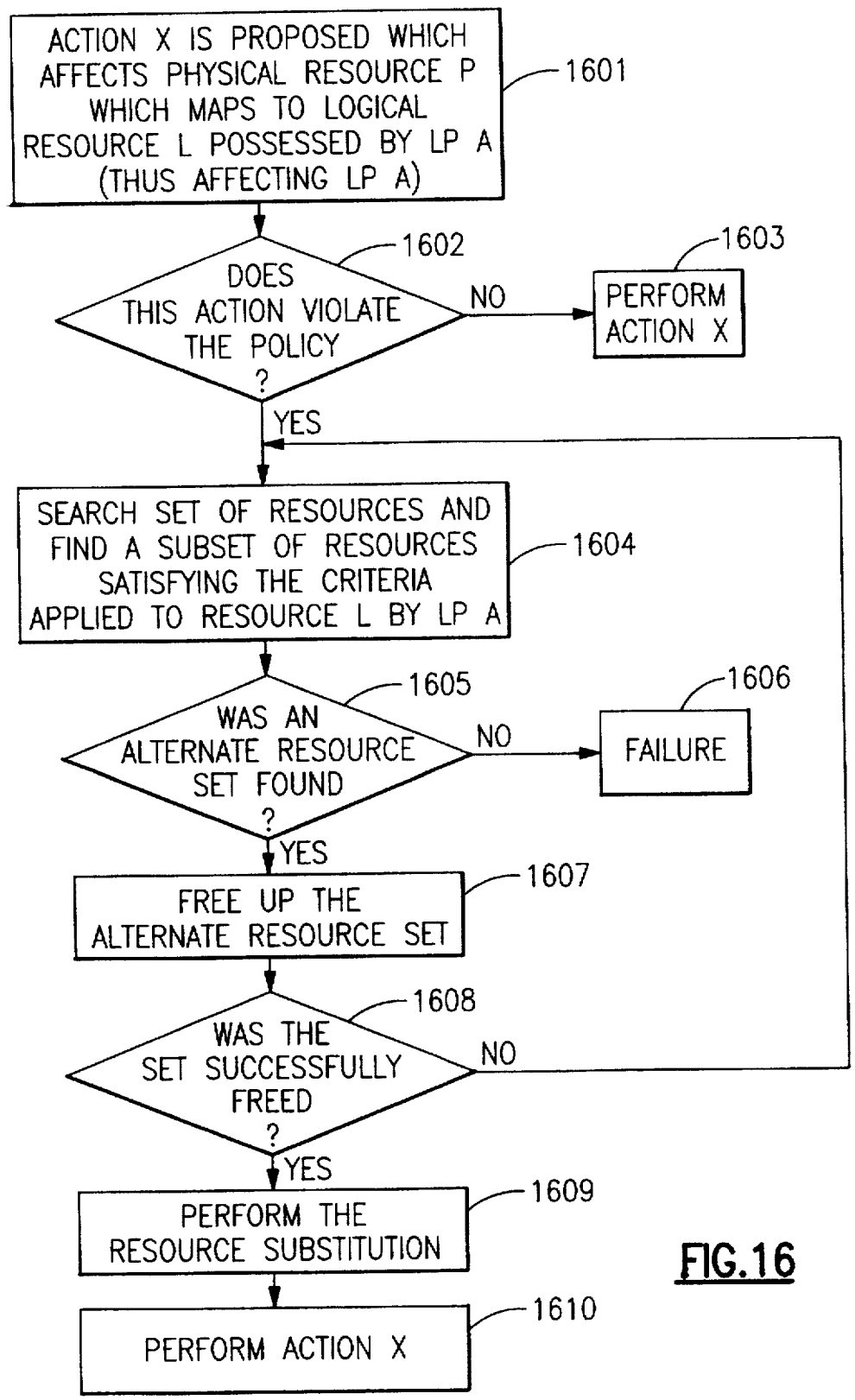
FIG. 16 is a flowchart illustrating the deriving of a set of preliminary steps for a reconfiguration action to be taken without violating a policy.

The process of deriving a set of preliminary steps for an action is illustrated in FIG. 16. Assume that an action X is proposed that affects a physical resource P which maps to logical resource L possessed by LP A, and therefore action X would affect LP A 1601. Action X is checked against the policy 1602. If action X does not violate the policy, it is performed 1603. If the action violates the policy, a search is performed through the set of resources to find a subset of resources satisfying the criteria applied to the resource L by LP A (i.e., provide equivalent amount and have properties identical to those of the resource L) 1604. The search is done in order to substitute an alternate set of resources for resource P, thus eliminating the effects of action X on LPA—the equivalent set of resources would provide an equivalent amount of resource and have properties identical to those of resource P. If an alternate resource set was not found 1605, the failure is registered 1606 and the process ends (until the policy is revised or other resources become available). If an alternate resource set was found, an attempt is made to free up the resources in that set 1607. If the resources cannot be freed 1608, the search 1604 is repeated in an attempt to find a different set. If the resources are freed successfully, the logical resource L is moved to the physical resources in the newly freed set, and the physical/logical resource mapping is adjusted to reflect the new physical/logical resource correspondence 1609. (The contents of logical resource L are physically moved from physical resource P to the alternate resource set and the logical resource ID's are swapped so the move is transparent.) Then the physical resource P no longer maps to the logical resource L and action X, although it affects the physical resource P, no longer affects the logical resource L and therefore has no effect on LP A; so action X no longer violates the policy. Therefore, it is possible to perform action X on the physical resource P and keep the logical resource L and LP A intact 1610.

Returning now to the flow of FIG. 7:

If such an alternate action was found 707, it is recorded in the actual action list 714.

If no alternate action can be found 707, operator intervention is requested 708.

The operator is asked to modify the policy or perform a partial configuration change using the partial list of configuration changes that do not violate the policy 708.

The process then awaits the operator decision 709.

If the policy was modified 710, the whole process is repeated (starting with the step 702).

If the policy was not modified 710, the operator is offered to perform a partial configuration change 711.

If the operator rejects the partial configuration change offer 712, the configuration change is not possible 713.

If the operator requests the partial configuration change 712, the collected set of actual actions is executed 715.

Cancelling Hardware-Initiated Reconfiguration Requests

Figure 8:
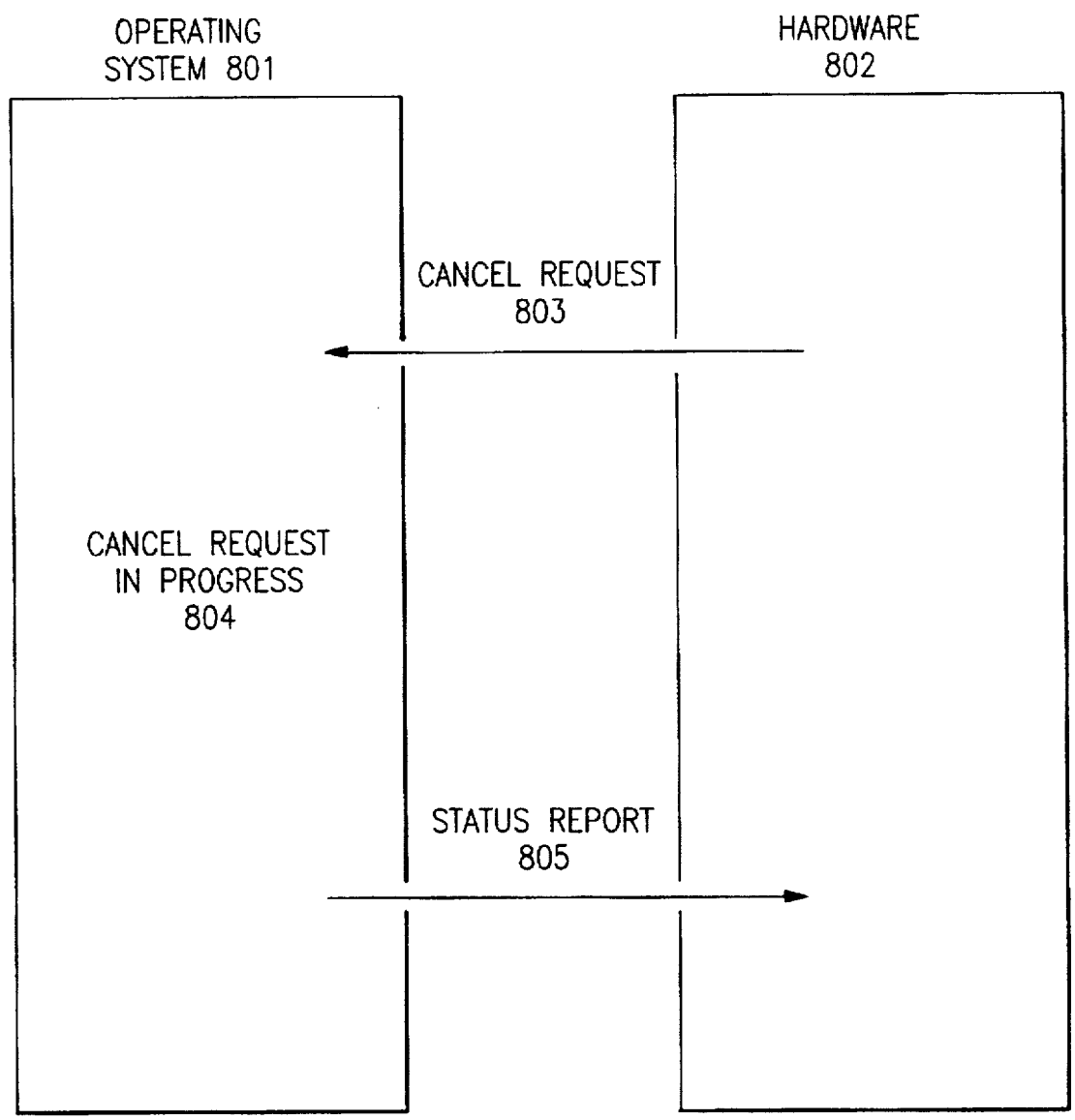
FIG. 8 illustrates the reconfiguration request cancellation.

FIG. 8 illustrates how the hardware 802 may cancel the processing of a reconfiguration request by sending the CP 801 a cancel request 803 containing a cancel indicator 618, and the ID of the request to be cancelled. The CP then will attempt to cancel the specified request 804 and follow up with a status report 805 indicating success or failure.

EXAMPLE 1

Dynamic Partitioning in LPAR Mode

Figure 3:
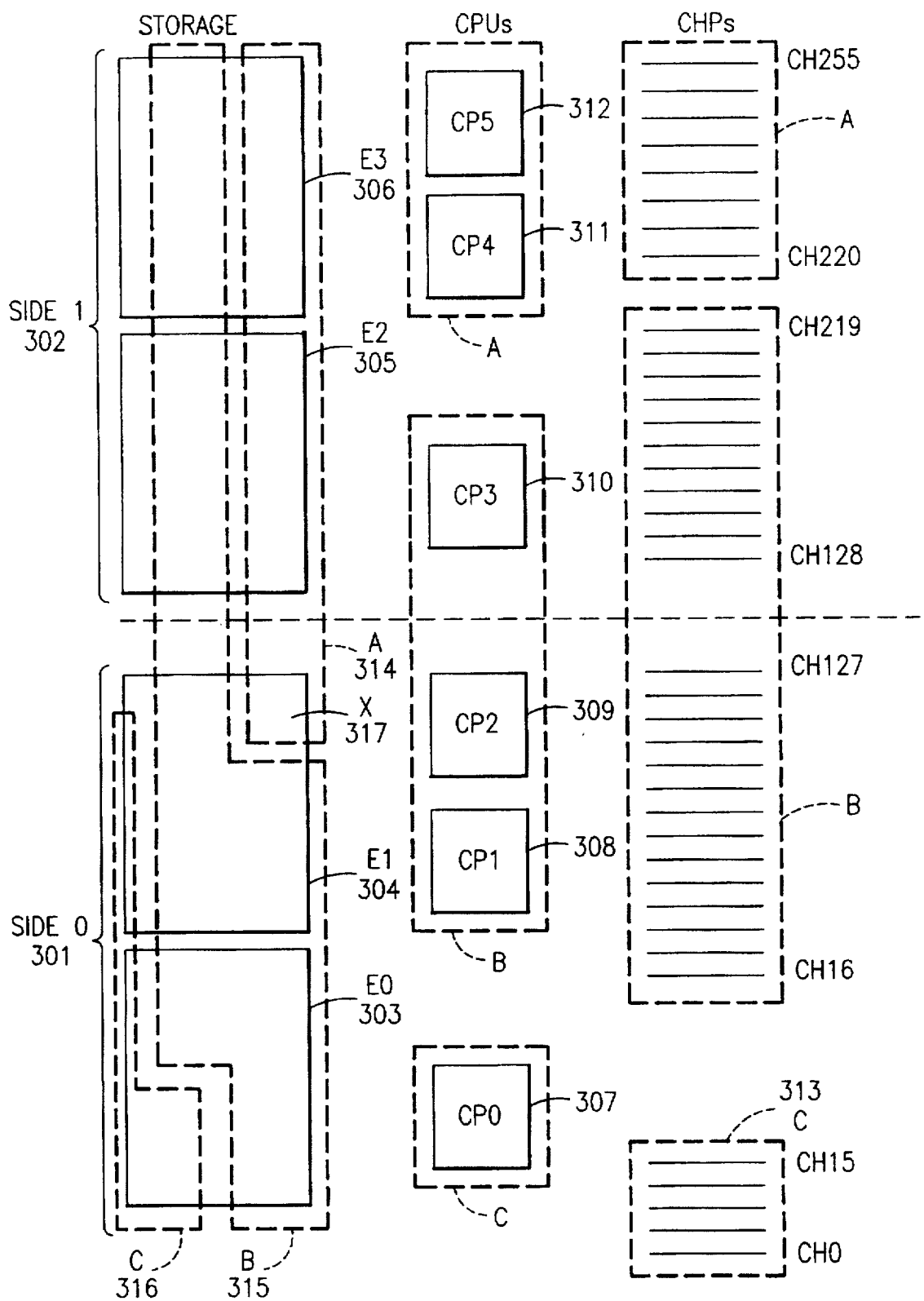
FIG. 3 illustrates the initial configuration for an example of dynamic partitioning in the hardware-initiated reconfiguration environment in LPAR mode.

Consider the configuration presented on FIG. 3 consisting of two physical partitions (or sides)—side 0 301 and side 1 302. The configuration includes four storage elements (E0 through E3 303 304 305 306), six CPUs (CP0 through CP5 307 308 309 310 311 312), and 256 channel paths (CHP) numbered 0 through 255 (313). Logically, the configuration is subdivided into three logical partitions (A 314, B 315, and C 316). Logical partition A includes CPUs 4 and 5, channel paths 220 through 255, and some storage in elements E1, E2 and E3. Logical partition B includes CPUs 1, 2, and 3, channel paths 16 through 219, and storage in elements E0, E1, E2 and E3. If it is necessary to take side 1 off-line, the policy, in conjunction with the current physical to logical resource mapping (see below), may prescribe that logical partition A be deactivated, logical partition B relinquish its resources on side 1, and logical partition C be left intact. In order to take side 1 off-line, the following set of actions may be taken:

1. Quiesce and deactivate logical partition A.
2. Present a reconfiguration request to logical partition B requesting it to deconfigure the list of storage increments that LPAR maps in storage element E3.
3. Present a reconfiguration request to logical partition B requesting it to deconfigure the list of storage increments that LPAR maps in storage element E2.
4. Present a reconfiguration request to logical partition B requesting it to free up CPU 3.
5. Present a series of reconfiguration requests to logical partition B requesting it to free up channel paths 128 through 219.
6. Take side 1 off-line.
7. Since logical partition A was deactivated, the policy may prescribe what to do with its storage that is now freed up on side 0 (marked X 317). Assuming that the policy prescribes that available storage be given to logical partition B, SCLP will present partition B with a request to acquire area X in storage element E1.

Figure 4:
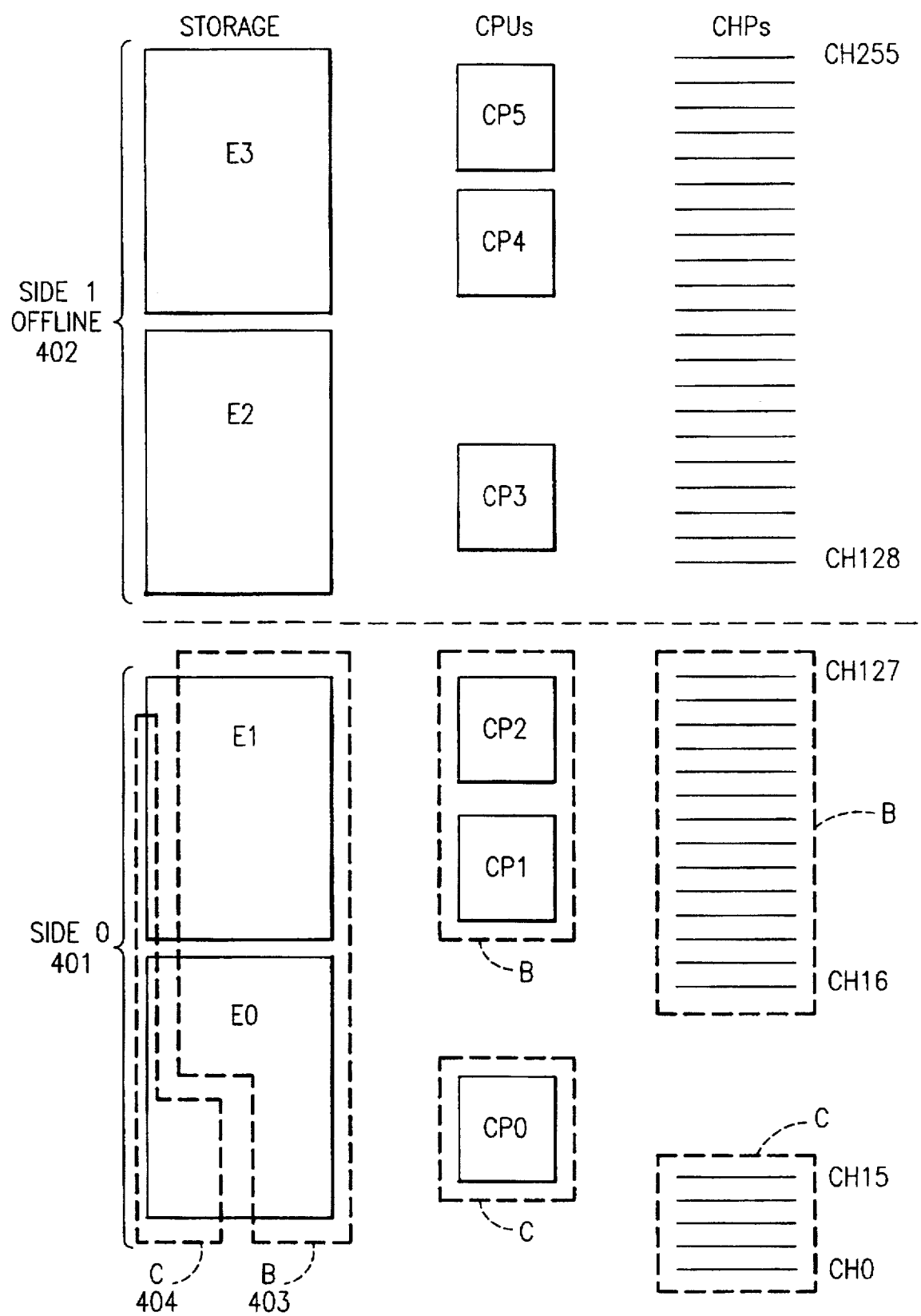
FIG. 4 illustrates the final configuration for an example of dynamic partitioning in the hardware-initiated reconfiguration environment in LPAR mode.

The resulting configuration is shown on FIG. 4. There are still two sides 401, 402, but side 1 is now off-line along with all the hardware resources it includes. Side 0 now supports logical partitions B 403 and C 404.

EXAMPLE 2

Hardware-Initiated Migration in LPAR Mode

Figure 5:
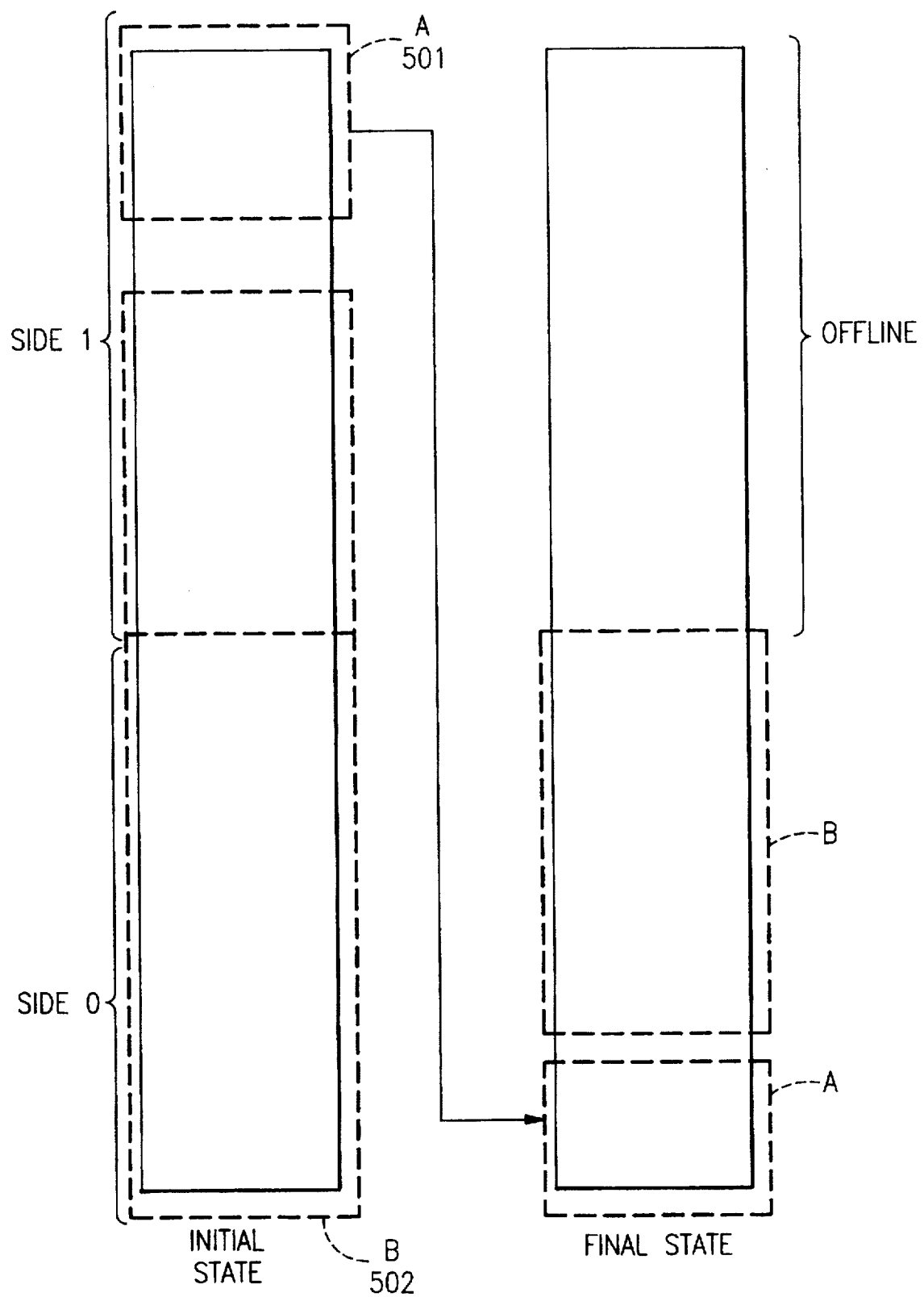
FIG. 5 illustrates the initial and final configuration in one case of dynamic partitioning in the hardware-initiated reconfiguration environment in LPAR mode where a system survives the SI→PP transition, but is currently incapable of participating in the hardware-initiated reconfiguration process.

Consider an LPAR mode configuration illustrated in FIG. 5, where logical partition B 502 is capable of accepting reconfiguration requests, but logical partition A 501 is not. Also, assume that the policy requires partition A to be kept intact if the side its storage is on is taken off-line. Should it be necessary to take the side containing storage for logical partition A off-line, free storage in the remaining partition may be used to transparently move partition A's storage. In order to free up storage on the remaining side for partition A, it may be necessary to request some other partition (in this case, B) to free that storage.

Thus, a partition incapable of processing reconfiguration requests may still survive an SI to PP transition.

Notification about Dynamic Hardware Resource Installation

The reconfiguration request may also be used to notify the CP about availability of a newly-installed hardware resource. A hardware resource may be dynamically installed, and then a reconfiguration request may be sent to the CP designated by the policy to acquire that resource. The reconfiguration request would have a special "installed resource" bit 607 set in it designating a newly-installed resource availability.

Mapping

Figure 18:
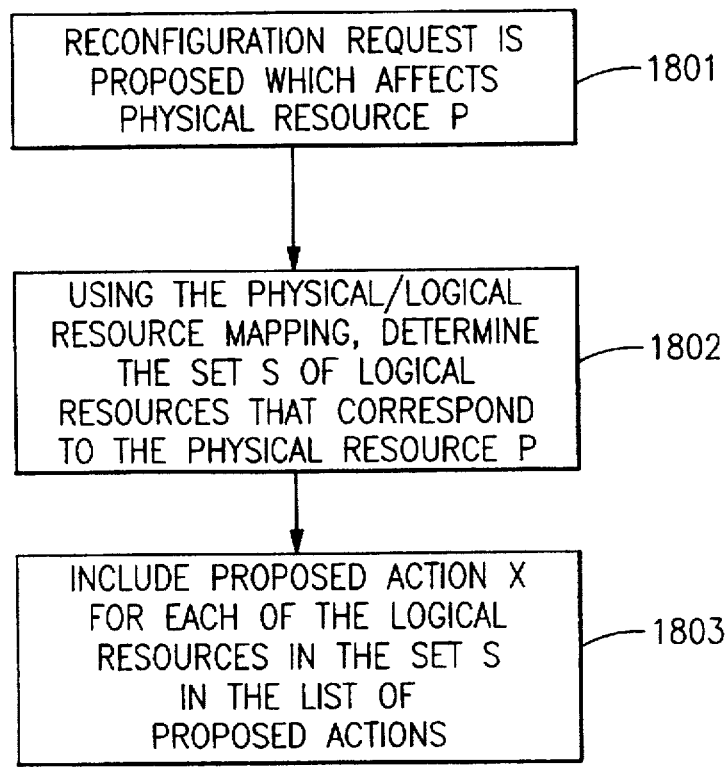
FIG. 18 is a flowchart illustrating the process for deriving a set of proposed reconfiguration actions prior to the policy verification.

FIG. 18 illustrates the process of deriving a set of proposed reconfiguration actions prior to policy verification. Assume that a reconfiguration request is proposed which affects physical resource P 1801. The process of determining the logical resource set S corresponding to physical resource P is performed 1802 (using the process shown in FIG. 17 and explained below). The list of proposed actions to be performed on logical resources corresponding to physical resource P is derived by replicating the action in the reconfiguration request (action X) for each logical resource in the set S, using that logical resource as an object of the action 1803. If the freeing of logical resources results in removing all essential logical resources from a logical partition (as is the case in the example of FIG. 13 after indicating that logical SE 0 in LP A should be configured off line—leaving LP A with no logical storage elements), then an action is added to the proposed list deactivating the LP in question. Note that the list is constructed by first considering the proposed physical reconfiguration, then deducing the necessary logical reconfiguration; but the list is built with the logical steps first—as the logical reconfiguration must be performed before the physical reconfiguration can be.

Figure 17:
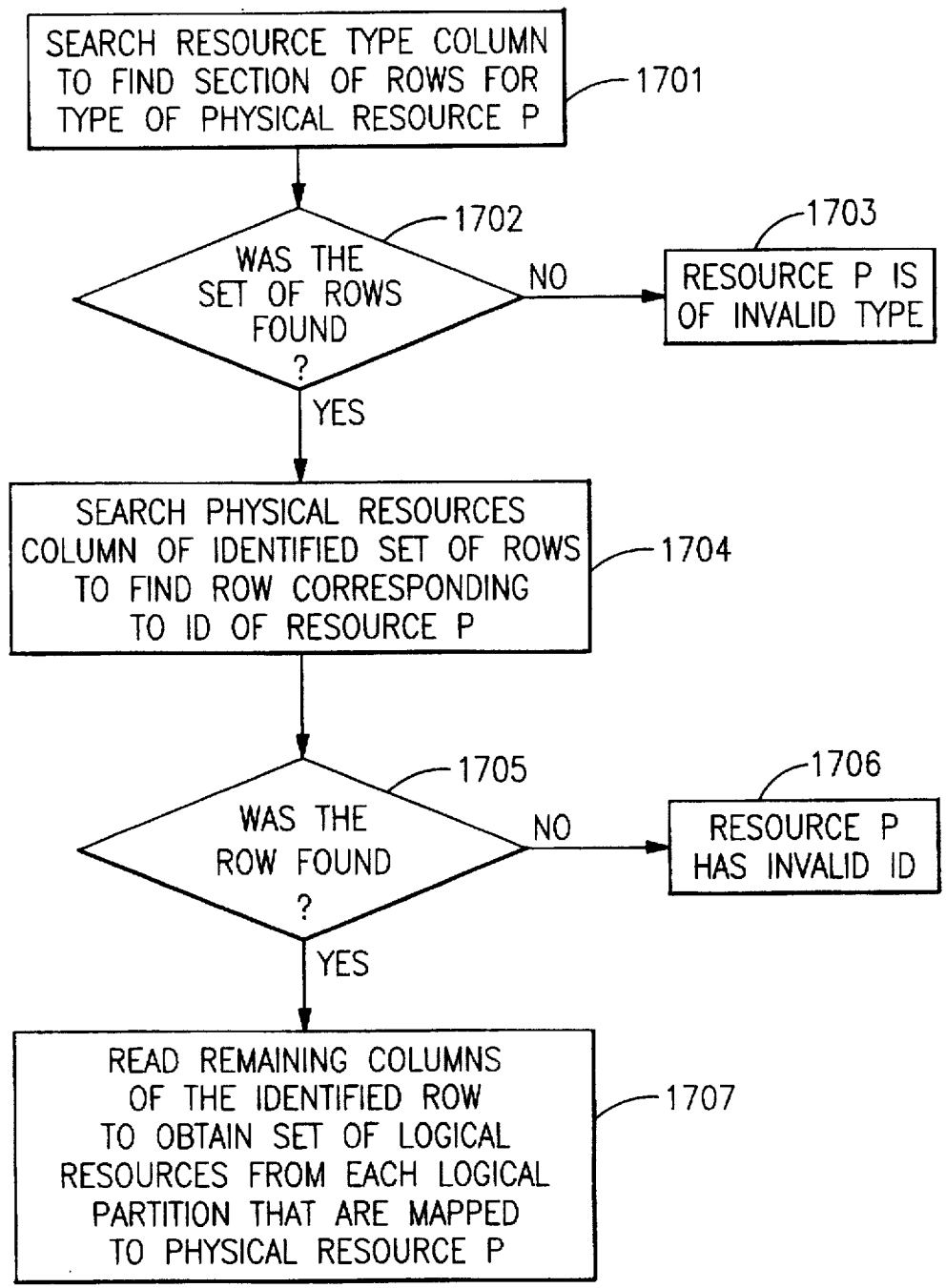
FIG. 17 is a flowchart illustrating the use of physical/logical mapping to derive a set of logical resources for a physical resource.

The use of physical/logical resource mapping is illustrated in FIG. 17. Given a physical resource P, it is necessary to determine the set of logical resources it maps into. A search is performed through the first (resource type) column of the table to find the section of rows corresponding to the type of the physical resource P 1701. If the set of rows was not found 1702, the resource P type is not valid 1703, otherwise, a search is performed through the second column (physical resources) of the set of rows previously determined to find the row corresponding to the ID of resource P 1704. (For simplicity, the table of FIG. 11 shows only the ID's for the storage elements (SE0,SE1,SE2,SE3). It is understood that the section of rows for CPU's would consist of 4 rows each with its own CPU ID; and the section corresponding to CHP's would consist of 256 rows each with its own ID. In the example, LPA has one logical CPU; LPB shows 2 CPU's etc. and since CPU's are shared, the total does not have to add to the physical CPU total). If the row was not found 1705, resource P ID is invalid 1706, otherwise, the remaining columns of the row just found are used to contain the set of logical resources from each logical partition that map into the physical resource P 1707.

Physical to Logical Resource Mapping—Example

Figure 15:
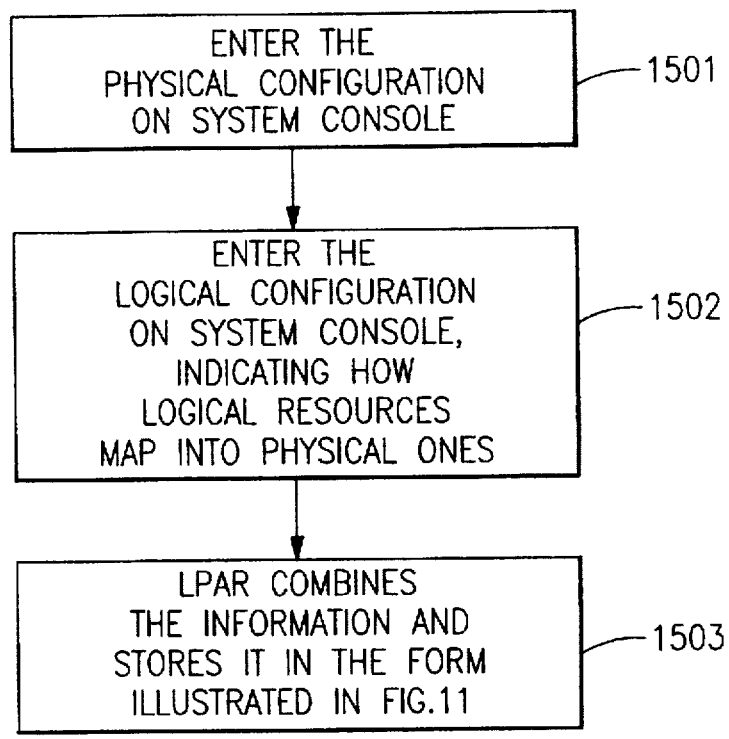
FIG. 15 is a flowchart showing the process of obtaining the physical and logical configuration information and storing the physical/logical resource mapping.

In LPAR mode, each logical partition possesses a set of logical resources mapped by LPAR microcode to some subset of the physical resource set. The correspondence between logical and physical resource IDs is not known to logical partitions, but is maintained by LPAR microcode in a table, example of which is illustrated in FIG. 11. The physical 1128 and logical 1129 configurations and the layout of logical resources within physical (as illustrated in FIG. 11) are entered on the system console by the operator as a part of system customization as illustrated in FIG. 15. The operator enters the physical configuration on the system console 1501. Then the operator enters the logical on the system console, indicating how logical resources map into the physical ones 1502. LPAR microcode stores the information entered by the operator and combines 1503 it in the form of the table illustrated in FIG. 11. When a need to send a request to a logical partition arises, this table is used to perform translation between logical resource IDs known to logical partitions and physical resource IDs known to LPAR microcode.

Consider an example of 4 logical partitions: A (1124), B (1125), C (1126), and D (1127). The physical configuration consists of 4 CPUs (1101), 256 CHPs (1102) and 4 storage elements, each containing 256 Mbytes of storage: SE 0 (1103), SE 1 (1104), SE 2 (1105), and SE 3 (1106). Given that, the physical configuration may map into the 4 logical configuration as follows.

LP A may be given:
1 (1107) of the CPUs,
64 CHPs (1108),
and one logical storage element—SE 0 (1109) (as shown in storage layout 1207), containing 128 Mbytes that occupy half of the physical SE 0 1203.

LP B may be given:
2 1110 of the CPUs,
64 CHPs 1111,
and 4 logical storage element:
SE 0 1112 1214, containing 128 Mbytes that occupy half of the physical SE 0 1203;
SE 1 1113 1211, also containing 128 Mbytes and located in physical SE 2 1205;
SE 2 1114 1210, containing 64 Mbytes and located in physical SE 1 1204;
and SE 3 1115 1212, containing 64 Mbytes and located in physical SE 3 1206.

LP C may be given:
2 1116 of the CPUs,
64 CHPs 1117,
and 3 logical storage element:
SE 0 1118 1208, containing 128 Mbytes that occupy half of the physical SE 1 1204;
SE 1 1119 1209, containing 64 Mbytes in physical SE 1 1204;
SE 2 1120 1213, containing 64 Mbytes and located in physical SE 3 1206.

LP D may be given:

1 1121 of the CPUs,

64 CHPs 1122, and one logical storage element SE 0 1123 1215, containing 256 Mbytes and located partially in the physical SE 2 1205 and partially in the physical SE 3 1206.

For simplicity, this example is restricted to storage reconfiguration, though other resources would use the same process.

The physical configuration consists of two sides—0 1201 and 1 1202, each containing two physical storage elements.

Assume that the policy for an SI→PP transition 1301 prescribes the following:

Keep LP A intact 1302.

Deactivate LP D 1303.

Split LPs B and C 1304 and 1305.

Figure 12:
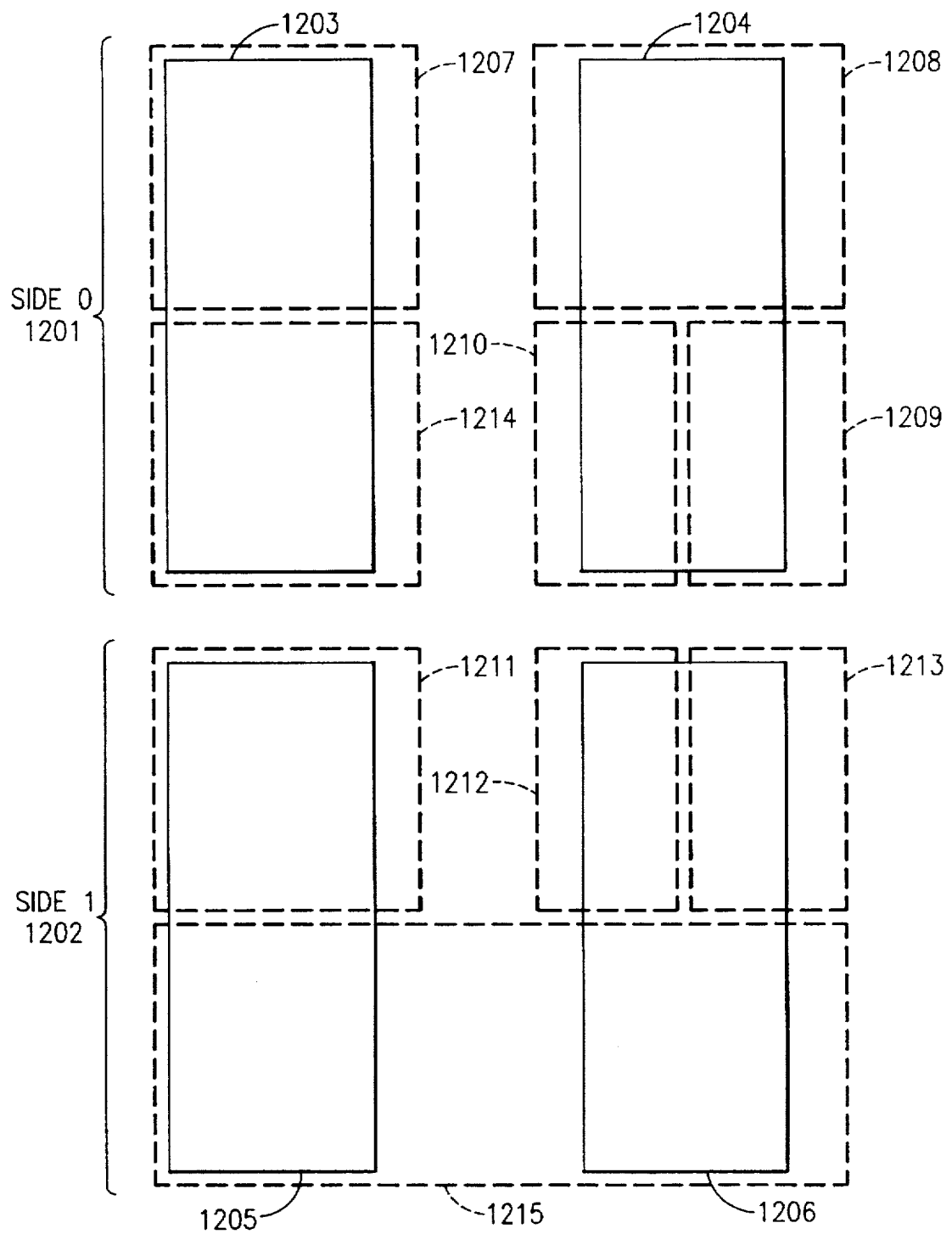
FIG. 12 illustrates the physical/logical storage element mapping table in LPAR mode.
Figure 14:
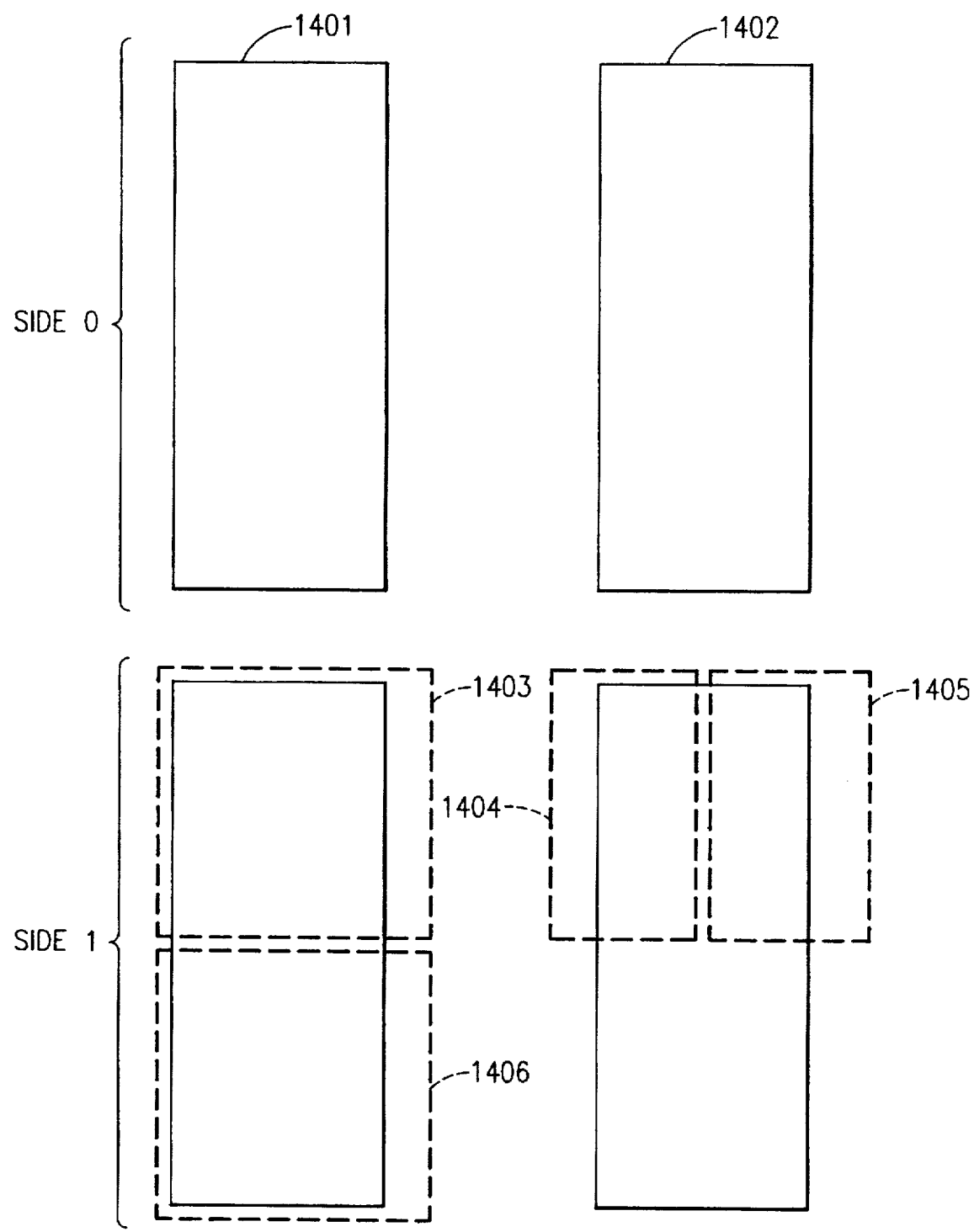
FIG. 14 illustrates the physical/logical storage element mapping after an SI→PP transition in LPAR mode.

When the operator requests 1306 an SI→PP transition 1307, and assuming that the request is to keep side 1 (indicated either on the request itself, or in the policy) 1202, the physical requirements for storage element reconfiguration 1308 are to configure physical SE 0 and SE 1 off-line 1309 1310 (these comprise side 0). The proposed actions after mapping physical to logical storage elements 1311 (using the table illustrated in FIG. 12), prior to applying the policy, are as follows:

Logical actions:

Deactivate LP A 1312.

Configure logical SE 0 in LP B off-line 1313.

Configure logical SE 2 in LP B off-line 1314.

Configure logical SE 0 in LP C off-line 1315.

Configure logical SE 1 in LP C off-line 1316.

Physical actions:

Configure physical SE 0 off-line 1325.

Configure physical SE 1 off-line 1326.

Once the policy is applied, the actual actions taken 1318 are as follows:

Deactivate LP D 1319. (Unconditional action from policy ... see FIG. 7, step 716)

Transparently move LP A to storage previously occupied by LP D in physical SE 2 1320. (Alternative action for "Deactivate LP A" proposed action, which violates policy—see fig.7, step 706)

Configure logical SE 0 in LP B off-line 1321. (proposed action that does not violate policy)

Configure logical SE 2 in LP B off-line 1322. (proposed action that does not violate policy)

Configure logical SE 0 in LP C off-line 1324. (proposed action that does not violate policy)

Configure logical SE 1 in LP C off-line 1323. (proposed action that does not violate policy)

Configure physical SE 0 off-line 1327. (proposed action that does not violate policy)

Configure physical SE 1 off-line 1328. (proposed action that does not violate policy)

The resulting configuration would have physical SE 0 1401 and SE 1 1402 off-line; LP B possessing logical SE 1 1403 and SE 3 1404; LP A possessing logical SE 0 1406; LP C possessing logical SE 2 1405.

The invention claimed is:

1. A method for dynamically reconfiguring memory resources in a logically partitionable data processing system wherein each such logical partition is capable of having a unique control program running therein, said method comprising the steps of:

processing a first memory reconfiguration request for a first area of memory used by a first logical partition of said data processing system, said first logical partition continuing to function yet being incapable of processing memory reconfiguration requests, said incapability arising from the nature of the control program running in said first logical partition;

identifying a second area of memory, said second area of memory being used by a second logical partition of said data processing system, said second logical partition being capable of processing memory reconfiguration requests as a result of the nature of the control program running in said second logical partition;

passing a second memory reconfiguration request to said second logical partition such that said second memory reconfiguration request is processed by said second logical partition and said second area of memory is freed; and substituting said second area of memory for said first area of memory in a manner transparent to said first logical partition.

2. The method claim 1, wherein said second area of memory is the same size as said first area of memory.

3. The method of claim 1 wherein, after said substituting said second area of memory for said first area of memory in a manner transparent to said first partition, said first partition continues operation using said second area of memory.

4. The method of claim 3, wherein the steps of determining, identifying and passing are hardware-initiated generally independent of the first and second partitions by using an initiation path originating at a processor controller element and continuing through a hypervisor managing the first and second logical partitions.

5. A system for dynamically reconfiguring memory resources in a logically partitionable data processing system wherein each such logical partition is capable of having a unique control program running therein, said system comprising:

means for processing a first memory configuration request for a first area of memory used by a first logical partition of said data processing system, said first logical partition continuing to function yet being incapable of processing said first memory reconfiguration request as a result of the nature of the control program running in said first logical partition;

means for identifying a second area of memory, said second area of memory being used by a second logical partition of said data processing system, said second logical partition being capable of processing memory reconfiguration requests as a result of the nature of the control program running in said second logical partition;

means for passing a second memory reconfiguration request to said second logical partition such that said second memory reconfiguration request is processed by said second logical partition and said second area of memory is freed; and means for substituting said second area of memory for said first area of memory in a manner transparent to said first logical partition.

6. The system of claim 5, wherein said second area of memory is the same size as said first area of memory.

7. The system of claim 5, wherein, after said substituting said second area of memory for said first area of memory in a manner transparent to said first partition, said first partition continues operation using said second area of memory.

8. The system of claim 7, wherein the means for determining, identifying and passing are included in a means for hardware-initiation generally independent of the first and second partitions, said means for hardware-initiation using an initiation path originating at a processor controller element and continuing through a hypervisor managing the first and second logical partitions.

9. A method for dynamically reconfiguring memory resources in a logically partitionable data processing system wherein each such logical partition is capable of having a unique control program running therein, said method comprising:

processing a first memory reconfiguration request for a first area of memory used by a first logical partition of said data processing system, said first logical partition continuing to function yet being incapable of processing said first memory reconfiguration request as a result of the nature of the control program running in said second logical partition;

identifying a second, available area of memory; and substituting said second area of memory for said first area of memory in a manner transparent to said first logical partition.

10. The method of claim 9, wherein said second area of memory is the same size as said first area of memory.

11. The method of claim 9 wherein, after said substituting said second area of memory for said first area of memory in a manner transparent to said first partition, said first partition continues operation using said second area of memory.

12. The method of claim 11, wherein the steps of determining and identifying are hardware-initiated generally independent of the first partition by using an initiation path originating at a processor controller element and continuing through a hypervisor managing the first partition.

13. A system for dynamically reconfiguring memory resources in a logically partitionable data processing system wherein each such logical partition is capable of having a unique control program running therein, said system comprising:

means for processing a first memory reconfiguration request for a first area of memory used by a first logical partition of said data processing system, said first logical partition continuing to function yet being incapable of processing said first memory reconfiguration request as a result of the nature of the control program running in said first logical partition;

means for identifying a second, available area of memory; and means for substituting said second area of memory for said first area of memory in a manner transparent to said first logical partition.

14. The system of claim 13, wherein said second area of memory is the same size as said first area of memory.

15. The system of claim 13 wherein, after substituting said second area of memory for said first area of memory in a manner transparent to said first partition, said first partition continues operation using said second area of memory.

16. The system of claim 15, wherein the means for determining and identifying are included in a means for hardware-initiation generally independent of the first partition, said means for hardware-initiation using an initiation path originating at a processor controller element and continuing through a hypervisor managing the first partition.

17. A method of operating a data processing system having logical partitions so that logical partitions lacking memory reconfiguration processing capability as a result of the nature of the control program running in those logical partitions are nonetheless operated in a continuing manner by providing transparent memory substitution by another operating logical partition that does have the capability of processing memory reconfiguration requests as a result of the reconfiguration capability of the control program running in that other logical partition.

* * * * *